United States Patent
Fukuda et al.

(10) Patent No.: US 8,246,465 B2
(45) Date of Patent: Aug. 21, 2012

(54) GAME SYSTEM, SERVER AND TERMINAL MACHINE

(75) Inventors: Hirotaka Fukuda, Tokyo (JP); Katsuhiro Kato, Tokyo (JP); Takashi Hayashi, Tokyo (JP); Tomotake Haruta, Tokyo (JP); Katsuyoshi Tanabe, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 864 days.

(21) Appl. No.: 12/158,503

(22) PCT Filed: Nov. 8, 2006

(86) PCT No.: PCT/JP2006/322235
§ 371 (c)(1),
(2), (4) Date: Jun. 20, 2008

(87) PCT Pub. No.: WO2007/074582
PCT Pub. Date: Jul. 5, 2007

(65) Prior Publication Data
US 2009/0098942 A1   Apr. 16, 2009

(30) Foreign Application Priority Data
Dec. 27, 2005   (JP) ................................. 2005-376083

(51) Int. Cl.
*A63F 9/24* (2006.01)
*A63F 13/00* (2006.01)
(52) U.S. Cl. .......................................... 463/42; 463/16
(58) Field of Classification Search .............. 463/16–20, 463/25, 40, 42, 43
See application file for complete search history.

(56) References Cited

U.S. PATENT DOCUMENTS

| | | | | |
|---|---|---|---|---|
| 6,319,122 | B1 * | 11/2001 | Packes et al. ................... | 463/16 |
| 6,800,027 | B2 * | 10/2004 | Giobbi et al. ................... | 463/24 |
| 6,811,486 | B1 * | 11/2004 | Luciano, Jr. .................... | 463/24 |
| 6,884,172 | B1 * | 4/2005 | Lloyd et al. .................... | 463/42 |
| 7,927,209 | B2 * | 4/2011 | Gagner et al. .................. | 463/25 |
| 2002/0173357 | A1 * | 11/2002 | Yoshida .......................... | 463/42 |
| 2002/0183105 | A1 * | 12/2002 | Cannon et al. ................. | 463/16 |
| 2003/0064809 | A1 * | 4/2003 | Okada ............................ | 463/42 |
| 2004/0018875 | A1 | 1/2004 | Shimoda | |
| 2004/0214629 | A1 * | 10/2004 | Walker et al. .................. | 463/20 |
| 2006/0111170 | A1 * | 5/2006 | Hornik et al. .................. | 463/16 |

FOREIGN PATENT DOCUMENTS

JP   06-225961   8/1994
(Continued)

*Primary Examiner* — David L Lewis
*Assistant Examiner* — Shauna-Kay Hall
(74) *Attorney, Agent, or Firm* — Edwards Wildman Palmer LLP; Peter C. Schechter; Brian R. Landry

(57) ABSTRACT

A game system according to the present invention includes a server and a plurality of terminal machines; the server holds setting state information to be set in the terminal machines; the setting state information is provided to the terminal machine; and, when obtaining the setting state information, the terminal machines set the setting state information as its own local state, and executes a game based on the local state. The local states of the terminal machines vary with the situations of the game, and the local state at the moment of game end is transmitted to the server. The server which has received the local state at the moment of game end from the terminal machine updates the setting state information into the local state.

17 Claims, 12 Drawing Sheets

FOREIGN PATENT DOCUMENTS

| | | |
|---|---|---|
| JP | 09-081495 | 3/1997 |
| JP | 11-146938 | 6/1999 |
| JP | 2000-126442 | 5/2000 |
| JP | 2002-253863 | 9/2002 |
| JP | 2002-306854 | 10/2002 |
| JP | 2004-057686 | 2/2004 |
| JP | 2005-058487 | 3/2005 |
| TW | 559564 | 11/2003 |

* cited by examiner

GAME SYSTEM, SERVER AND TERMINAL MACHINE

CROSS-REFERENCE TO PRIOR APPLICATIONS

This is a U.S. national phase application under 35 U.S.C. §371 of International Patent Application No. PCT/JP2006/322235, filed Nov. 8, 2006, and claims the benefit of Japanese Application No. 2005-376083, filed Dec. 27, 2005, both of which are incorporated by reference herein. The International Application was published in Japanese on Jul. 5, 2007 as International Publication No. WO 2007/074582A1 under PCT Article 21 (2).

TECHNICAL FIELD

The present invention relates to a game system in which a game is executed by consuming a predetermined virtual game value depending on operations of a player, and a server and a terminal machine which are used in the game system.

BACKGROUND ART

There has been already known a game system which includes a terminal machine and a server system, and by which a predetermined game is performed (refer to, for example, Japanese Patent Application Laid-Open No. 2002-306854).
On the other hand, there has been already well known a game machine which is installed at a game corner in an amusement arcade or a shop, and through which a game is executed depending on the operations of a player by consuming a game value such as medals and coins (refer to, for example, Japanese Patent Application Laid-Open No. 6-225961 and Japanese Patent Application Laid-Open No. 11-146938).

SUMMARY OF THE INVENTION

In a case where a game machine is installed in, for example, an amusement arcade like the above mentioned game machine, a plurality of players use one game machine one after another. Continuing the state of the game machine at the moment when an immediately preceding player ends the game, the following player begins to play the game. However, a terminal machine in a game system including a server and the terminal machine is often used by an individual person, and is not used one after another by a plurality of players. Accordingly, in a case where a game provided by the game machine is configured to be provided by the terminal machine in a conventional game system, the state of the terminal machine is always continued by a same player, and it is difficult to start the game from the state of another player.
When only a same player uses a same terminal machine, especially when the state of game end is bad, the next game must be started in the bad state. Accordingly, there is a fear of reduced motivation for playing the game. On the other hand, when a server is configured to provide a virtual game machine, a load of the server becomes a problem, considering the control complexity, and the number of players playing at the same time.
An object of the present invention is to provide a game system, and the like in which a game environment, similar to that of a game machine used for a plurality of players, can be virtually realized without adding a load to a server.
The game system according to the present invention solves the above mentioned problem by configured the following.

The game system including a server and a plurality of terminal machines capable of communicating with the server, a game being executed based on operations of a player by consuming predetermined virtual game value in each of the plurality of terminal machines, wherein the server has: a setting information storage device for storing setting state information indicating a state relating to the game to be set in the terminal machine; a setting information update device for updating the setting state information of the setting information storage device when update information to update the setting state information is obtained from the terminal machine; and a setting information providing device for providing the setting state information of the setting information storage device to the terminal machine when the setting state information is required from the terminal machine, and each of the plurality of terminal machines has: a setting information obtaining device for requiring the setting state information to the server when a starting operation of the game is performed to obtain the setting state information from the server, and setting the obtained setting state information as local state information indicating a state of its own; a game control device for executing the game based on the local state information; a local information control device for varying the local state information with situations of the game; and an update information transmission device for transmitting the local state information as the update information to the server when an ending operation of the game is performed.

According to the game system of the present invention, the server holds the setting state information indicating a state to be set in the terminal machine, and, in the terminal machine, the setting information obtaining device obtains the setting state information from the server at the moment of starting operation of a game, and sets the setting state information as the local state information. Then, the game is executed based on the local state information by the game control device, and the local state information is changed based on the game situations by the local information control device. That is, the local state information indicating the state of the terminal machine is set to the setting state information firstly, but after that, varies with the situations of game. Therefore, at the moment of a game ending operation, the local state information becomes different from the setting state information obtained from the server.

Then, the setting state information held in the server is updated into the local state information at the game ending operation by the setting information update device. Accordingly, the setting state information held by the server will be updated one after another into the local state information of the terminal machines in which the game is ended. Then, to the terminal machine in which a starting operation of the game has been performed after updating the setting state information, the updated setting state information is provided, and the updated setting state information is set in the terminal machine as the local state information.

As mentioned above, the server unifies management of the setting state information in the game system, thereby for the whole game system, the state of the terminal machine where the game is ended last is used as the state of the terminal machine where the game is started next. Accordingly, the state caused by a player who has played the game until just before can be virtually continued to the next player, and game environment same as that of a game machine located in an amusement arcade and the like is realized. Accordingly, as a player can use a game environment caused by other players to play the game, an unknown game environment can be used every time the player starts the game, which does not make the player become tired of.

Moreover, as the control of the game and the control of the local state information are executed in the terminal machine, the server is only required to update the setting information held in the server with the update information, so even if a large number of people plays the game at the same time, the load of the server is small. Thereby, game environment same as that of a game machine used by a plurality of players can be virtually realized without adding a load to the server.

The virtual game value may be something symbolizing as a predetermined game value, electronic information such as the number of number of times, points, and the like, which are recorded in a storage medium such as an IC card, as well as something virtually imitating a physical medium such as a medal, a coin, a token which are required to be consumed in order to play a game, at a commercial-use game machine in an amusement arcade and the like. The setting state information is information indicating the state of the game machine used continuously among a plurality of players in the commercial-use game machine, and, for example, stay information of medals in a pusher game, stay information of stuffed toys in a crane game, and a payout rate in a slot game. "The situation of the game" to change the local state information includes, for example, the operation contents of the player, when game value is used the situation of using the game value, game playing time and the like.

The starting operation of game is an operation for starting the first game in the case where one player plays the game plural time. For example, the operation for activating the application for functioning as the terminal machine of the present invention and the access operation to the server of the present invention can be considered as the starting operation. And, the ending operation of the game is an operation which is performed after the last game in a case where one player plays a plurality of times. For example, an operation for ending the above-described application, and an operation for ending an access with the server of the present invention can be considered as the ending operation. The terminal machine may be a terminal machine of a portable type, or a terminal machine of a fixed type. The terminal machine of a portable type includes, for example, a portable telephone and a portable personal computer. The terminal machine of a fixed type includes, for example, a fixed-type personal computer and a home-use game machine.

The setting information storage device may store the setting state information as information to be shared among the plurality of terminal machines. As being used in each terminal machine, and updated by each terminal machine, the setting state information can be set as the information shared among a plurality of terminal machines.

the game may be a game in which the virtual game value is given to a player depending on a game result obtained by a probability which is changed by the state of the terminal machine, the setting state information may include information relating to a payout rate of the game value, the game control device may execute the game by setting the probability according to a local payout rate obtained from the local state information, the terminal machine may further have a result information obtaining device for obtaining properly from giving situations of the game value in the game executed in its own, a result payout rate which is a payout rate depending on play process in the game, and the local information control device may correct the information relating to the payout rate of the local state information so that the result payout rate approaches a target value which has been set beforehand.

Thereby, the payout rate of virtual game value given to a player can be controlled. Accordingly, even when it is required to control the probability of generation of giving the game value, the above control can be performed in the terminal machine, which causes the suppression of the server's load. For example, when a payout rate aimed in the whole game system is set as a target value of the result payout rate, the payout rate of the local state information is corrected by the local information control device so that the result payout rate approaches the target value. Therefore, it is possible to control so that the result payout rate is within a predetermined range from the target value. As mentioned above, as the result payout rate can be controlled in each of the terminal machines, the payout rate close to the target value as the whole system can be obtained without adding any load to the server. The information relating to the payout rate includes a case in which the information is the payout rate itself, and a case in which the information is a plurality of items required for calculating the payout rate.

the server may further have: a system payout rate obtaining device for obtaining properly a system payout rate which is a payout rate depending on a play process in the game in the plurality of terminal machines, by collecting from each of the terminal machines, information relating to the result payout rate at the moment of ending operation; and a setting information correction device for correcting the setting state information in the server storage device so that the system payout rate approaches the target value.

Thereby, the system payout rate of the payout rate depending on the play process in a game performed in each terminal machine, and the target value of the payout rate can be controlled so that they are within the predetermined range. Additionally, "properly" means that a suitable time, or a suitable amount of information may be set beforehand.

The server may further have a specific information storage device for storing specific state information by which the terminal machine is set to a specific state, and the setting information providing device may provide the specific state information as the setting state information to the terminal machine while predetermined specific conditions are satisfied. Thereby, while the specific conditions are satisfied, the local state information of the terminal machine can be set to the specific state information. The specific conditions include, for example, a predetermined time zone, and the predetermined state of the server, and the like.

Each of plural kinds of the setting state information may be stored in the setting information storage device in such a way that the each of setting state information is associated with an identification number unique to the setting state information, the setting information obtaining device may obtain the setting state information corresponding to the identification number by specifying the identification number, and set the setting state information as the local state information, the update information transmission device may transmit to the server, the update information including the identification number of the obtained setting state information, the setting information providing device may provide to the terminal machine, the setting state information corresponding to the identification number specified by the terminal machine, and the setting information update device may update with the update information, the setting state information corresponding to the identification number included in the update information.

Thereby, the server can manage the plural kinds of setting state information based on the identification number, and the terminal machine can make use of setting state information corresponding to the identification number by specifying the identification number.

The setting information storage device may store the setting state information corresponding to the specified identification number as information to be shared among the plurality of terminal machines specifying the identification number. Thereby, there can be formed a group which uses setting state information to be shared, for each identification number. Accordingly, for example, a player can join a desired group by specifying a desired identification number. On the other hand, when a specific identification information is set for a specific group, the setting state information corresponding to the specific identification information will be always shared in the specific group.

the game may be a game in which the virtual game value is given to a player depending on a game result obtained by a probability which is changed by the state of the terminal machine, the each setting state information may include information relating to a payout rate of the game value, the game control device may execute the game by setting the probability according to a local payout rate obtained from the local state information, the terminal machine may further have a result information obtaining device obtaining properly a result payout rate which is a payout rate depending on play process in the game from giving situations of the game value in the game executed in its own, and the local information control device may correct the information relating to the payout rate of the local state information so that the result payout rate approaches a target value which has been set beforehand.

Thereby, it is possible to control the payout rate of virtual game value given to a player. Accordingly, even when it is required to control the probability of generation of giving the game value, the above control can be executed in the terminal machine, which causes the suppression of the server's load. For example, when the payout rate aimed as the whole game system is set as a target value of the result payout rate, the payout rate of the local state information is corrected so that the result payout rate is close to the target value by the local information control device. Accordingly, the result payout rate can be controlled so that the rate is within the predetermined range from the target value. As mentioned above, the result payout rate can be controlled in each terminal machine. Therefore, the payout rate close to the target value can be obtained as the whole system without adding a load to a server. "Information relating to the payout rate" has been described above.

The server may further has: an ID payout rate obtaining device for obtaining properly an ID payout rate which is a payout rate depending on the play process in the game in each of the terminal machines using the setting state information corresponding to the identification information for each identification information, by collecting together with the identification information, information relating to the result payout rate at the ending operation from each of the terminal machines; and an ID setting information correction device correcting the setting state information of the identification information corresponding to the ID payout rate so that the ID payout rate approaches the target value. Thereby, for each identification number, the system payout rate, which is a payout rate depending on the play process in a game in each of the terminal machines, and the target value of the system payout rate can be controlled so that they are within the predetermined range. "Properly" means that suitable time, and a suitable amount of information may be set beforehand.

The server may further have a specific information storage device for storing specific state information by which the terminal machine is set to a specific state, and the setting information providing device may provide the specific state information as the setting state information to the terminal machine while predetermined specific conditions are satisfied, with respect to the setting state information corresponding to at least one of the identification numbers. Thereby, the local state information of the terminal machine can be set in the specific state information while the specific conditions are satisfied. As the above is effective for at least one identification number, the specific state information may be set only for the setting state information corresponding to the specific identification number, or the specific state information may be set for all kinds of the setting state information. The "specific conditions" has been already described above.

The game according to the present invention may be a virtual slot game, and the game value may be virtual medals. Thereby, there can be provided a virtual slot game which virtually realize a game environment same as the game environment in an actual slot machine.

The server according to the present invention solves the above mentioned problem by the following configuration: The server included in a game system including the server and a plurality of terminal machines capable of communicating with the server, a game being executed based on operations of a player by consuming a predetermined virtual game value in each of the plurality of terminal machines, wherein the server has: a setting information storage device for storing setting state information indicating a state relating to the game to be set in the terminal machine; a setting information update device for updating the setting state information of the setting information storage device when update information to update the setting state information is obtained from the terminal machine; and a setting information providing device for providing the setting state information of the setting information storage device to the terminal machine when the setting state information is required from the terminal machine. The server according to the present invention functions as the server of the game system according to the present invention.

The terminal machine according to the present invention solves the above mentioned problem by the following configurations: the terminal machine of a plurality of terminal machines in a game system including a server holding setting state information indicating a state to be set in each of the plurality of terminal machines, and the plurality of terminal machines capable of communicating with the server, a game being executed based on operations of a player by consuming a predetermined virtual game value in each of the plurality of terminal machines, the terminal machine having: a setting information obtaining device for requiring the setting state information to the server when a starting operation of the game is performed to obtain the setting state information from the server, and setting the obtained setting state information as local state information indicating a state of its own machine; a game control device for executing the game based on the local state information; a local information control device for varying the local state information with situations of the game; and an update information transmission device for transmitting the local state information as the update information to the server when an ending operation of the game is performed. The terminal machine according to the present invention functions as the terminal machine of the game system according to the present invention.

According to the present invention, there can be provided, as described above, a game system and the like, by which a game environment similar to that of a game machine to be used by a plurality of players, can be virtually provided without adding a load to a server, by setting as the local state information of the terminal machine at the moment of starting the game, the setting state information managed by the serve, and by updating with the local state information at the moment of ending the game, the setting state information managed by the server.

DETAILED DESCRIPTION OF THE INVENTION

Figure 1:
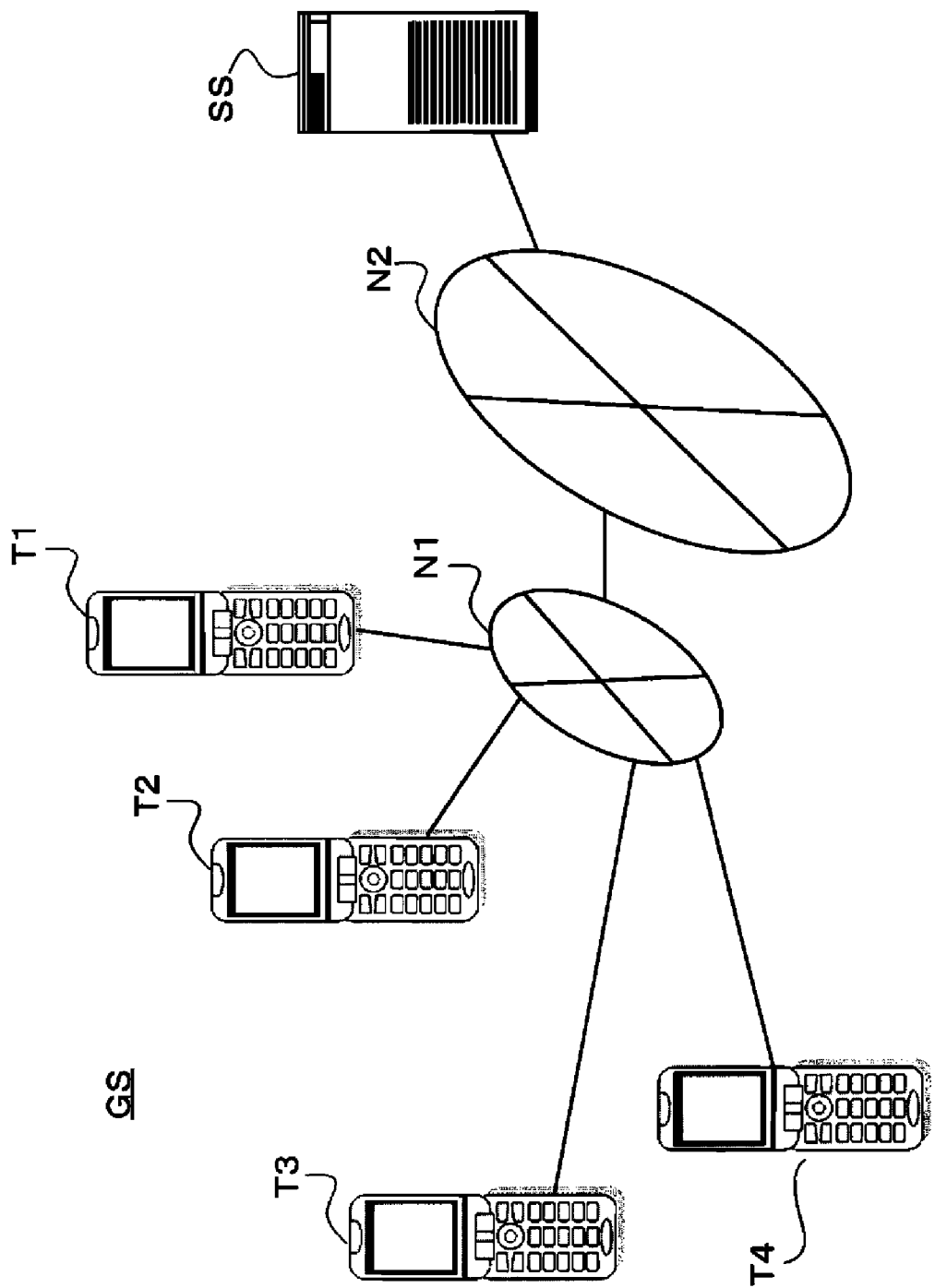
FIG. 1 is a diagram showing one example of a game system according to the present invention.

FIG. 1 is a drawing showing one example of a game system GS according to the present invention. In the game system GS, a plurality of portable terminal machines T1, T2, T3, and T4, and a server SS are connected with each other in such a way that data can be transmitted and received between them, and, at each of the portable terminal machines T1, T2, T3, and T4, a predetermined game can be played, based on operations of a player. Hereinafter, the portable terminal machines T1, T2, T3, and T4 are called "portable terminal machine T", especially, when it is not required to distinguish the portable terminal machines T1, T2, T3, and T4. The portable terminal machine T according to the present embodiment is a portable-type telephone, and the portable terminal machine T and the server SS are connected to each other through a portable telephone network N1 and the Internet N2.

The game according to the present embodiment is a virtual slot game in which the portable terminal machine T is regarded as a virtual slot machine. When a pattern as a game result, representing winning a prize is displayed on a line (hereinafter, it is called "bet line") on which a player bets by consuming a virtual medal as a virtual game value, a dividend is generated, and a predetermined number of virtual medals depending on the game result are given to the player. Here, for example, the game system GS according to the present embodiment is configured to include four portable terminal machines T, but, the number of the portable terminal machines T is not limited to this number. Moreover, "wining a prize" means a game result by which a virtual medal is given.

Figure 2:
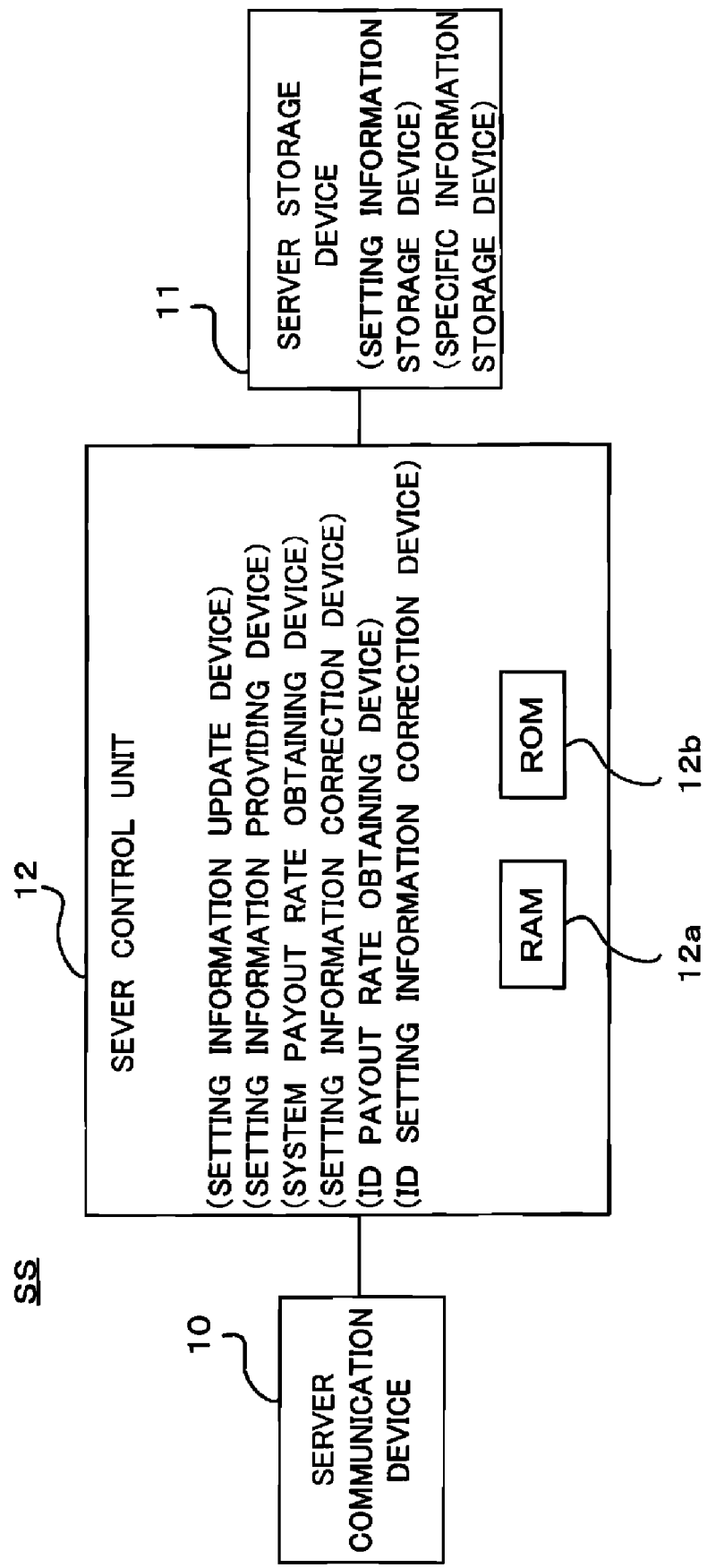
FIG. 2 is a schematic diagram showing a hardware configuration of a server according to the present embodiment.

The hardware configuration of the server SS will be explained, using FIG. 2. The server SS has: a server communication device 10 for transmission and reception of data to and from the portable terminal machine T; a server storage device 11 which stores various kinds of data required for execution of the present invention; and a server control unit 12 which controls the operations of components 10 and 11 mounted to the server SS. The server control unit 12 includes a CPU, and other peripheral circuits such as a RAM 12a, and a ROM 12b required for the operation of the CPU, and functions, mainly, as a setting information update device and a setting information providing device. The ROM 12b holds, for example, programs for making the server SS function as the server of the present invention.

The server storage device 11 stores setting state information indicating a state to be set in the portable terminal machine T as a setting information storage device. The setting state information is information indicating the state of the portable terminal machine T, to affecting a rate of winning prize of a game, and includes a payout rate and chance state information in the present embodiment. When the chance state information is "1", which indicates it is in a chance state, and, when the chance state information is "0", which means it is not in the chance state, but in a normal state. The chance state information will be described later. The server storage device 11 further stores specific state information as the specific information storage device. The specific state information is information by which the portable terminal machine T is made into the specific state. The specific state information according to the present embodiment is a specific payout rate to allow the portable terminal machine T to be into the specific state, and the chance state information.

Figure 3:
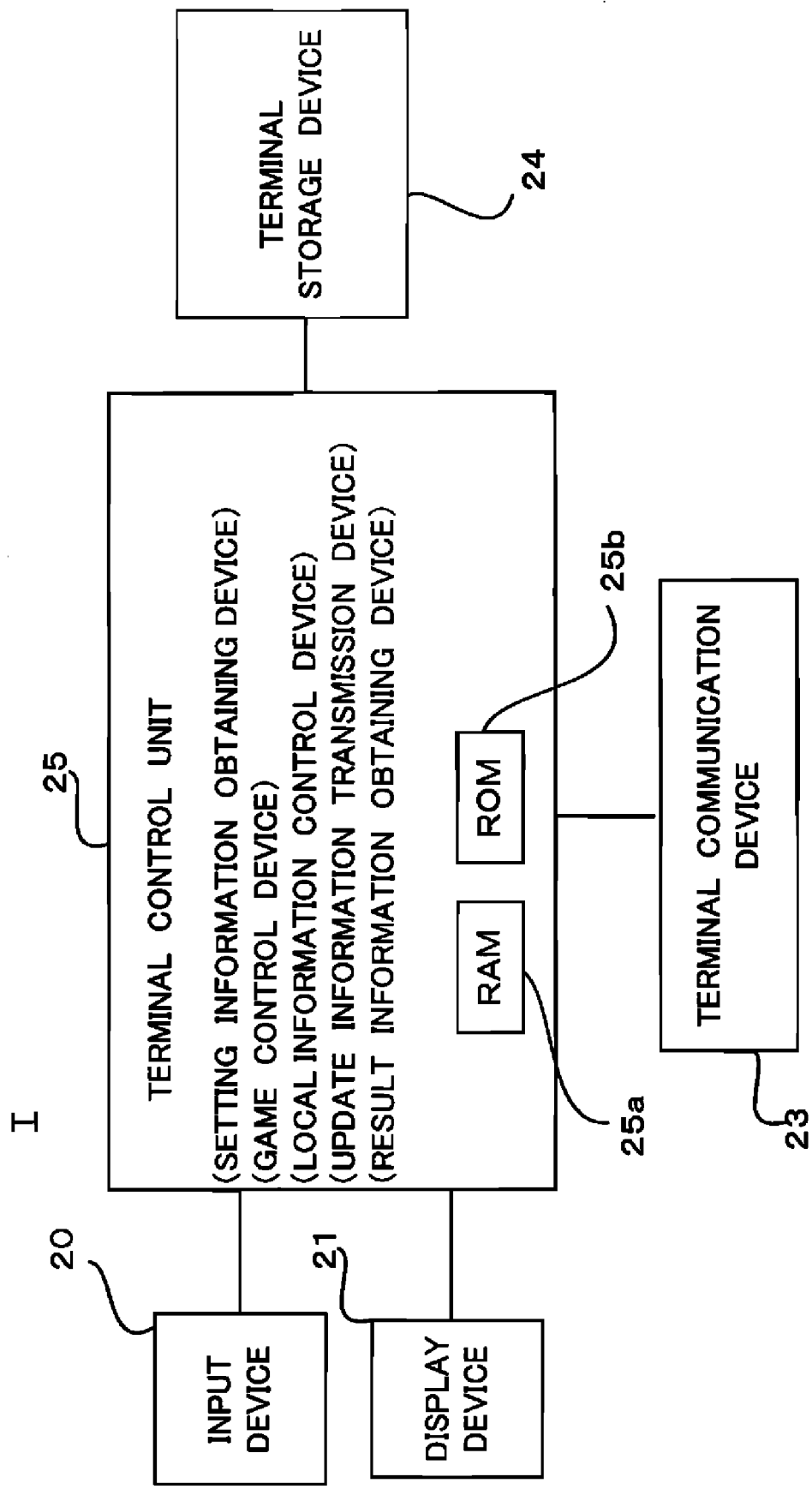
FIG. 3 is a schematic diagram showing a hardware configuration of a portable terminal according to the present embodiment.

The hardware configuration of the portable terminal machine T will be explained, using FIG. 3. The portable terminal machine T has: an input device 20 accepting input operations of a player; a display device 21 displaying various kinds of screens including a game screen later-described; a terminal communication device 23 for transmitting and receiving data to and from the server SS; a terminal storage device 24 storing various kinds of information for execution of the present invention; and a terminal control unit 25 which controls the operations of the components 20 . . . 24 in the portable terminal machine T. The terminal control unit 25 includes a CPU, and other peripheral circuits such as RAM 25a, and ROM 25b required for the operation of the CPU, and functions, mainly, as a setting information acquiring device, a game control device, a local information control device, and an update information communication device. The ROM 25b holds, for example, programs by which the portable terminal machine T functions as the portable terminal machine of the present invention.

Figure 4:
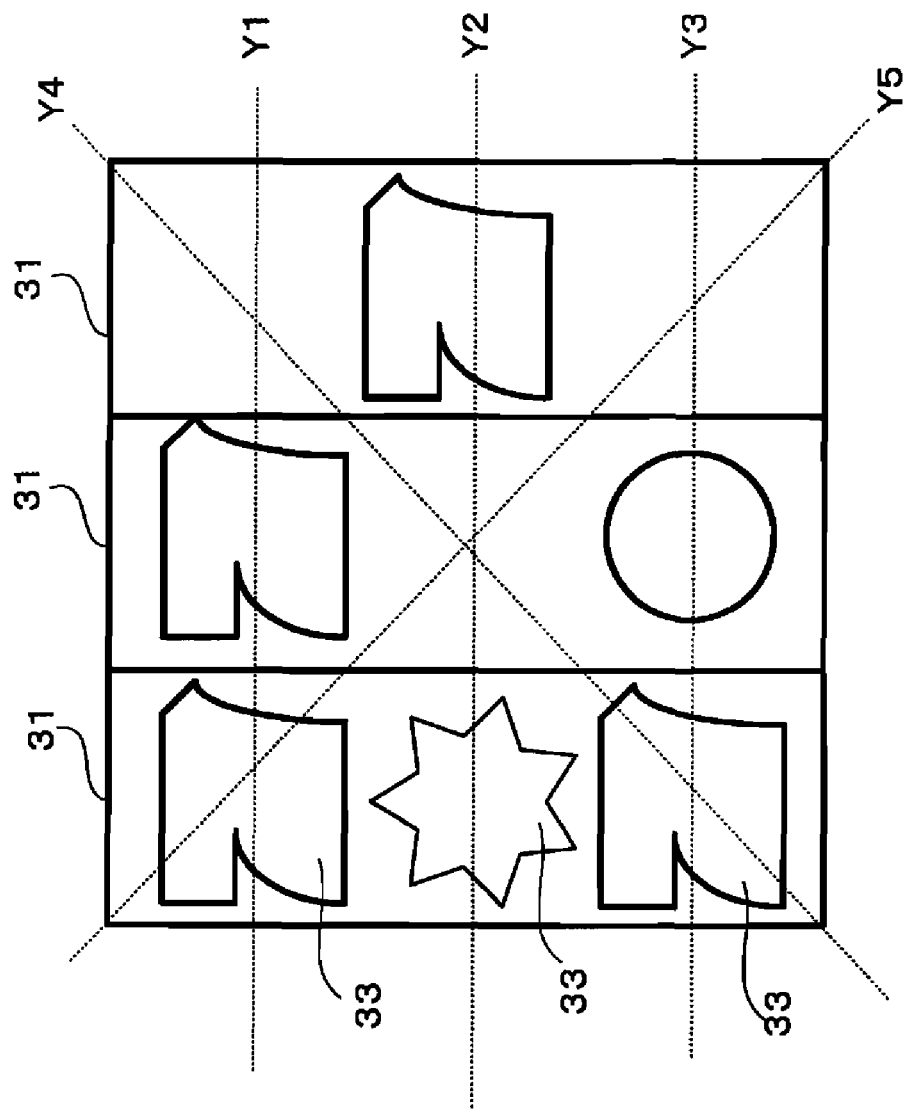
FIG. 4 is a diagram showing one example of a game screen displayed on a screen of a portable terminal machine.

In order to execute the virtual slot game, a game screen 30 is displayed by the display device 21, and the game screen 30 imitates a display window of a slot machine as shown in FIG. 4. A plurality of reel portions 31 are horizontally displayed on the game screen 30, and a plurality of patterns 33 are arranged and displayed in each of the reel portions 31 in the vertical direction. Moreover, there are lines Y on which a player can bet which are prepared in 5 directions Y1, Y2, Y3, Y4, and Y5. In the progress method of the virtual slot game itself, like the progress method in an actual slot machine, the patterns of the reel portions 31 are moved in the vertical direction by the rotation starting operation of a player first of all. After the predetermined time passes, the patterns in each of the reels 31 automatically stop, and, by the above stop, the state of the patterns displayed on the game screen 30 becomes the game result.

The terminal storage device 24 stores a table of winning prize probability where the kinds and the arrangements of patterns, each indicating a winning prize at a probability according to each payout rate, correspond to random numbers. The table of winning prize probability is prepared for each of various kinds of payout rates. At the portable terminal machine T, the table of winning prize probability according to a local payout rate described later is selected, and, it is judged by referring to the table of winning prize probability whether the pattern displayed as a game result wins a prize. For example, when a line Y2 is betted on, and the patterns of winning a prize are arranged on the bet line Y2, it is judged as "win a prize", and a dividend depending on the winning the prize is generated for the player. Moreover, the terminal storage device 24 also stores a table of chance state as a table of winning prize probability to be used in a case of a chance state the later-described. Additionally, winning prize probabilities different depending on the number or bets are set in the table of winning prize probability.

In the present embodiment, a game or one game is used as a term from a rotation starting operation by a player to the moment when virtual medals are given to a player as the game result, and, when a plurality of games are continuously played, play or one play is used as a term from the first game to the last game. In the present embodiment, a player can start a play by performing an operation for activating the program in the portable terminal machine T as a game starting operation. Login processing to the server SS is performed by the operation for activating the program.

After the login, a player can repeat a game over and over again. Then, in the present embodiment, the player can end the play by an operation for ending a program as a game ending operation. Logout processing to the server SS is performed by the operation for ending a program. Hereinafter, the moment of starting a play is called a login, the moment of ending the play is called a logout, and the term from the login to the logout is called a login state.

Figure 5:
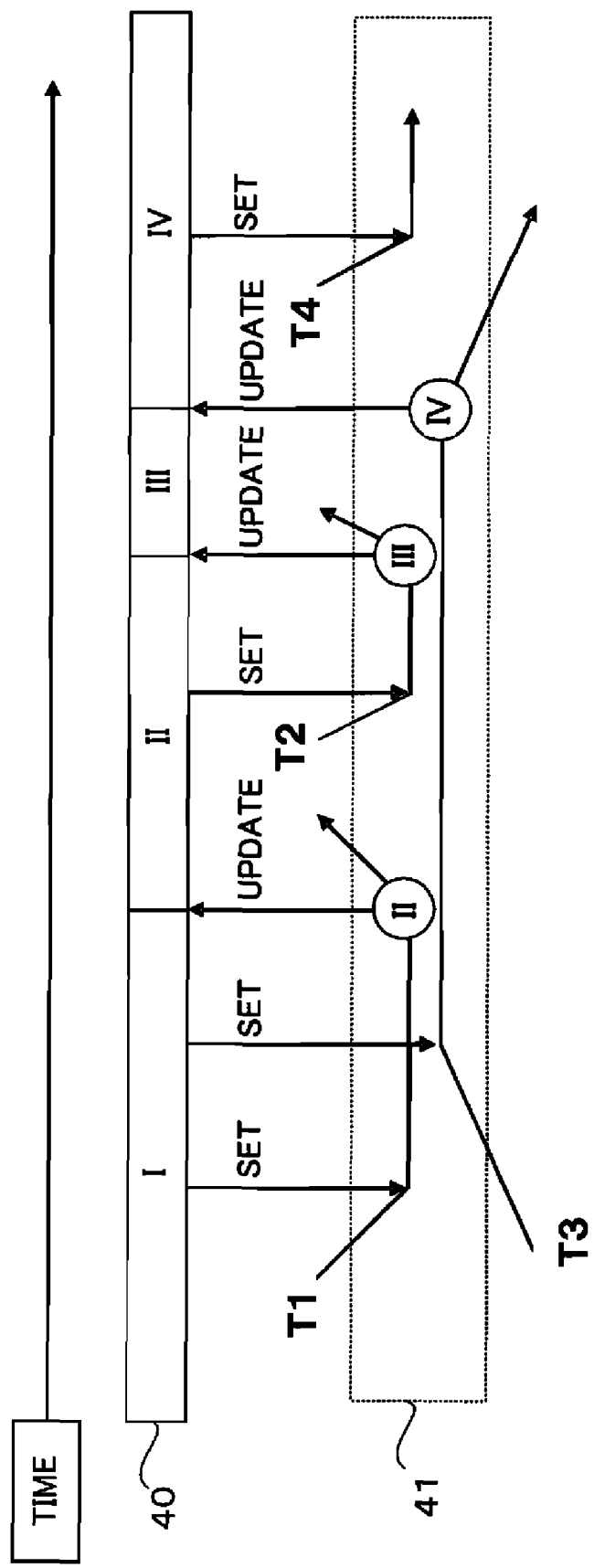
FIG. 5 is a drawing showing a relation between the state of each portable terminal machine and the setting state information.

In the game system GS, the setting state information in the server storage device 11 is updated by the portable terminal machine T, and the updated setting state information is set in the following portable terminal machine T. Updating and setting of the setting state information will be explained, using FIG. 5. A solid-line rectangle 40 shows a state of the setting state information in the server storage device 11. FIG. 5 shows the changes of the setting state information, such as the state is a state of "I" at first, but after that, changes to a state of "II", a state of "III", and a state of "IV". A dotted-line rectangle 41 shows a portable terminal machines T in the login state.

First of all, the portable terminal machine T1 will be explained. When the setting state information in the server SS indicates the state of "I", and the portable terminal machine T1 logs in, the state of "I" is obtained, and the local state information of the portable terminal machine T1 is set to the state of "I". The local state information is the information indicating the state relating to the game in each of the portable terminal machines T. Hereinafter, the state set to the local state information of the portable terminal machine T is sometimes called the state of the portable terminal machine T. The state of "I" is started in the portable terminal machine T1. With the situations of the game in the portable terminal machine T1, the state of the portable terminal machine T varies from the state of "I" to, for example, the state of "II". When the player logs out at the state of "II", the state of "II" is transmitted to the server SS. The server SS which has received the state of "II" updates the setting state information from the state of "I" into the state of "II".

After that, when the portable terminal machine T2 logs in, the portable terminal machine T2 is set in the state of "II", as the setting state information indicates the state of "II". Then, the play based on the state of "II" is started. With the situations of the game in the portable terminal machine T2, the state of the portable terminal machine T2 varies from the state of "II" to, for example, the state of "III". When the player logs out at the state of "III", the state of "III" is transmitted to the server SS. The server SS which has received the state of "III" updates the setting state information from the state of "II" into the state of "III".

On the other hand, a portable terminal machine T3, which logs in at the moment when the setting state information in the server SS indicates the state of "I", is set to the state of "I", like the portable terminal machine T1, and a play based on the state of "I" is started. With the situations of the game in the portable terminal machine T3, the state of the portable terminal machine T3 varies from the state of "I" to, for example, the state of "IV". When the player logs out at the state of "IV", the state of "IV" is transmitted to the server SS. The server SS which has received the state of "IV" updates the setting state information from the state of "III" into the state of "IV".

Then, when the portable terminal machine T4 logs in at the moment when the setting state information indicates the state of "IV", the portable terminal machine T4 is set to the state of "IV". As described above, by setting as the setting state information in the server SS, the state of the portable terminal machine T which has played the game until just before, the state of the portable terminal machine T where to start playing the game next is set to the state of the portable terminal machine T which has play the game until just before. Then, when the state of the setting state information is the state of "IV", and for example, when the portable terminal machine T2 which logged out at the state of "III" and logs in again, the player of the portable terminal machine T2 can start the game from the state of "IV". Accordingly, even when the state of "III" is a bad play situation for the player, the player of the portable terminal machine T2 can start the game from the state of "IV" different from the bad state of "III".

Moreover, in the game system GS, the state of the portable terminal machine T is configured to be in a specific state in a specific time zone. The specific time of the present embodiment is, for example, from noon to 2 p.m. When the specific time starts, the setting state information is set to the specific state, and the setting state information which has been set to the specific state is provided to the portable terminal machine T which has logged in. Moreover, the setting state information in the server SS is not updated by the local state information of the portable terminal machine T which has logged out in the specific time. Thereby, the portable terminal machine T which has logged in is always set into the specific state. Hereinafter, an example in which portable terminal machines T5, T6, and T7 log in will be concretely explained, using FIG. 6. A solid-line rectangle 40' shows a state of the setting state information in the server storage device 11 in the server SS, and a dotted-line rectangle 41' shows the portable terminal machines T in the login state.

First, when a portable terminal machine T5 logs in at the moment when the setting state information in the server SS indicates the state of "V", the portable terminal machine T5 is set to the state of "V" as the moment of login is out of the specific time. After that, even when the portable terminal machine T5 logs out within a specific time at the state of "II", the setting state information in the server SS is not updated, and maintains the specific state. When the portable terminal machine T6 logs in within the specific time, the server SS provides the setting state information set into the specific time to the portable terminal machine T6. Then, at the portable terminal machine T6, the local state information of the portable terminal machine T6 is set into the specific state. Thereby, the portable terminal machine T6 is set into the specific state.

After that, even when the portable terminal machine T6 logs out at the state of "III", if the moment of logout is within the specific time, the state information of the server SS is not updated into the state of "III". Thus, the setting state information in the server storage device 11 is not updated within the specific time. On the other hand, when logging in within the specific time, the portable terminal machine T7 becomes into the specific state, like the portable terminal machine T6. Then, when the portable terminal machine T7 logs out after 2 p.m. at the moment when the specific time elapsed, the setting state information in the server SS is updated from the specific state into the state of "VI", as it is out of the specific time.

Figure 6:
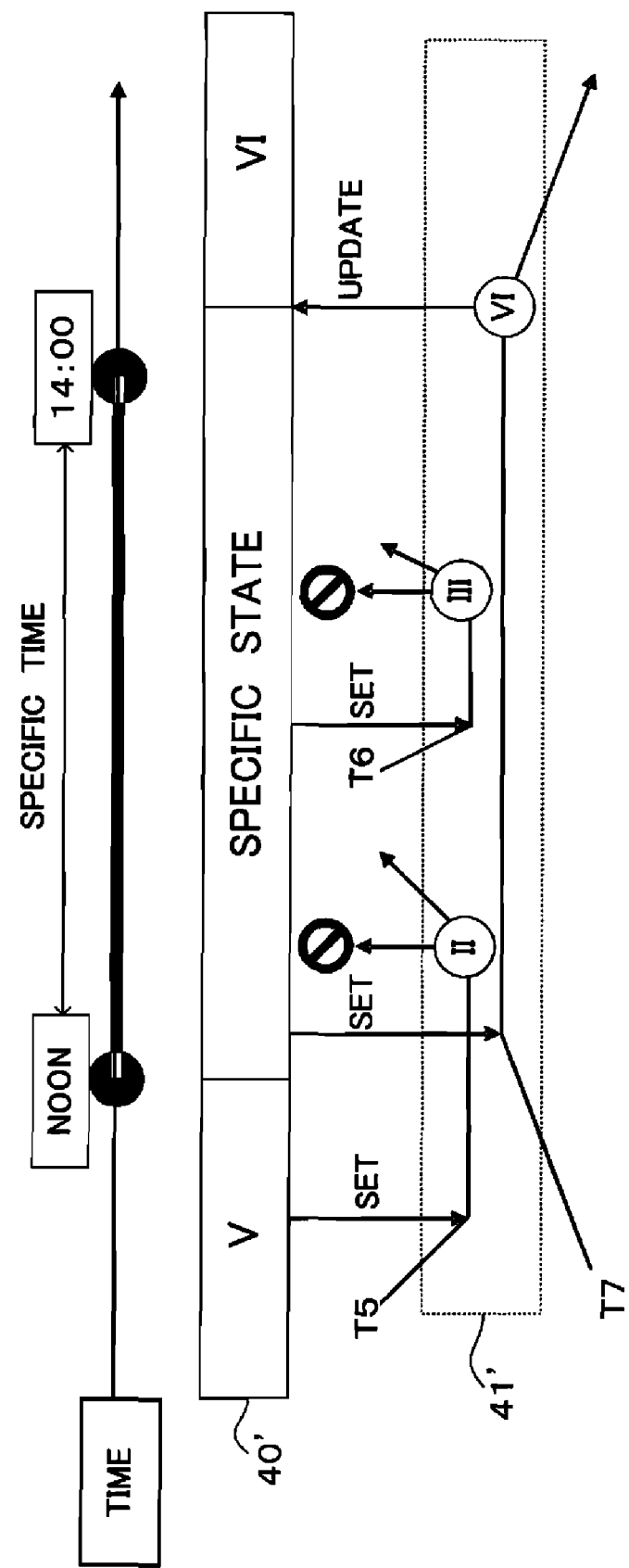
FIG. 6 is a drawing showing a relation between the state of each portable terminal machine and the setting state information at the specific time.

Here, in FIG. 6, the server SS is in the specific state until being updated by the portable terminal machine T6, there may be provided a configuration in which the specific state is terminated together with the end of the specific time, and the setting state information of the state of "V" which is the state before starting the specific time is provided.

Figure 7:
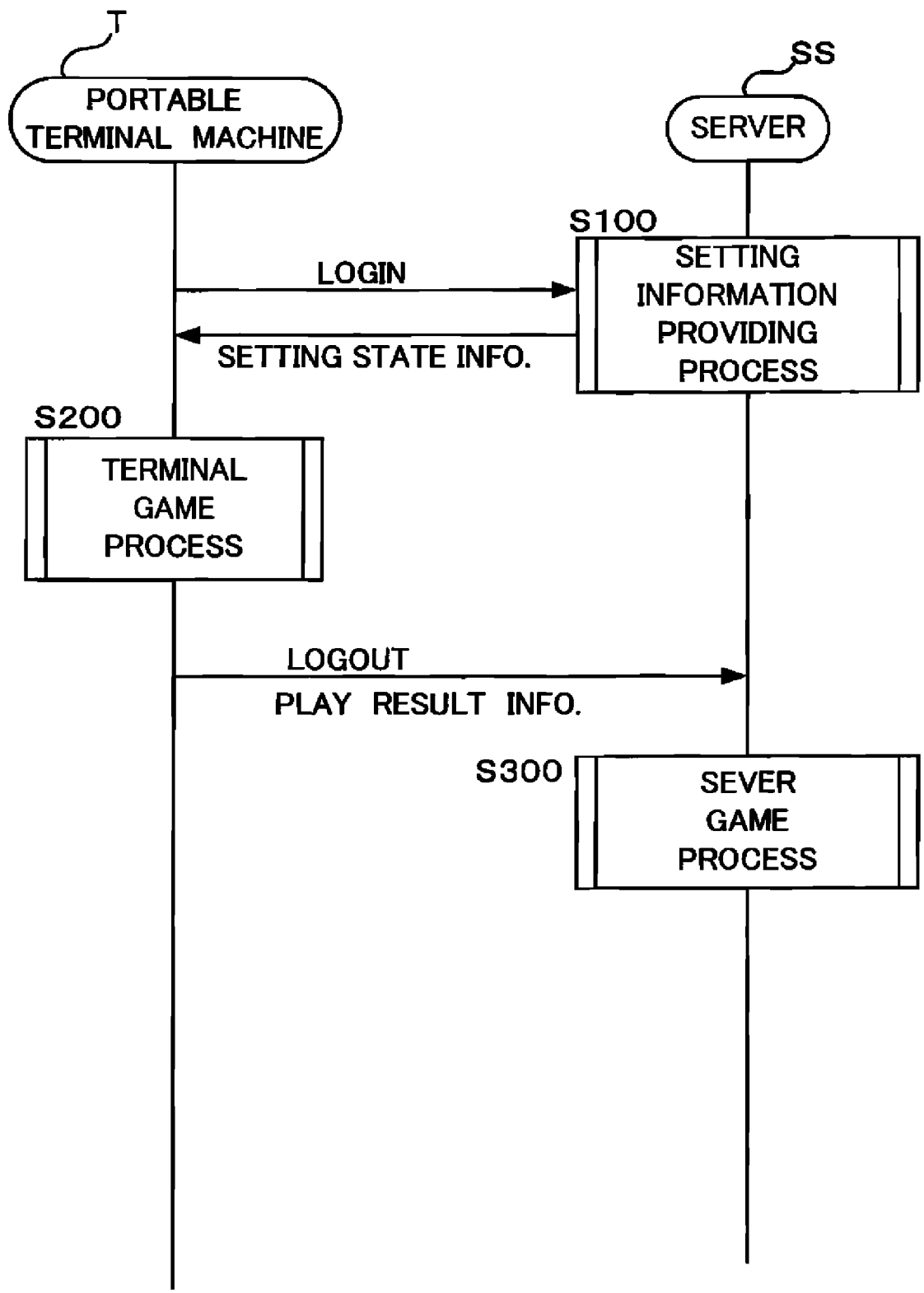
FIG. 7 is a sequence diagram showing process flow executed in each of the portable terminal machine and the server.

Next, the processes in the portable terminal machine T and those in the server SS will be explained, using FIG. 7 through FIG. 11. FIG. 7 is a sequence diagram showing a process flow between the portable terminal machine T and the server SS. The processes in the server SS is controlled by the control unit 12, and those in the portable terminal machine T is controlled by the control unit 25. First, the setting information providing process is executed at the server SS at step S100. In the setting information providing process, the setting state information to be provided to the portable terminal machine T is set, and the setting state information is provided to the portable terminal machine T which has logged in. Details of the setting information providing process will be described later.

On the other hand, at the portable terminal machine T, as mentioned above, when an operation for activating the program is performed, the login processing is executed to the server SS to log in to the server SS. In the login processing, the setting state information is required. Additionally, the number of virtual medals which a player having logged in can use is set at the moment of the login. For example, when the virtual medals of a player are pooled in the server SS, an arbitrary number of medals are withdrawn from the pooled virtual medals to the portable terminal machine T through communication for use. Moreover, when the virtual medals are pooled in the portable terminal machine T to be used by the player, the virtual medals can be used.

Next, at the portable terminal machine T, the terminal game process is executed, based on the setting state information obtained at the step S200. In the terminal game process, processes for executing the virtual slot game are performed. Details of the terminal game process will be described later. The logout process is executed by an operation of the player for ending the program. Thereby, the play can be ended.

At the moment of the logout, play result information is transmitted to the server SS as update information. The play result information includes the local state information and local history information at the moment of logout. Thereby, the terminal control unit 25 functions as an update information transmission device. The local history information will be described later. At the server SS receiving the play result information, server game process is performed at step S300.

In the server game process, processes are executed, based on the received play result information. Details of the server game process will be described later.

Figure 8:
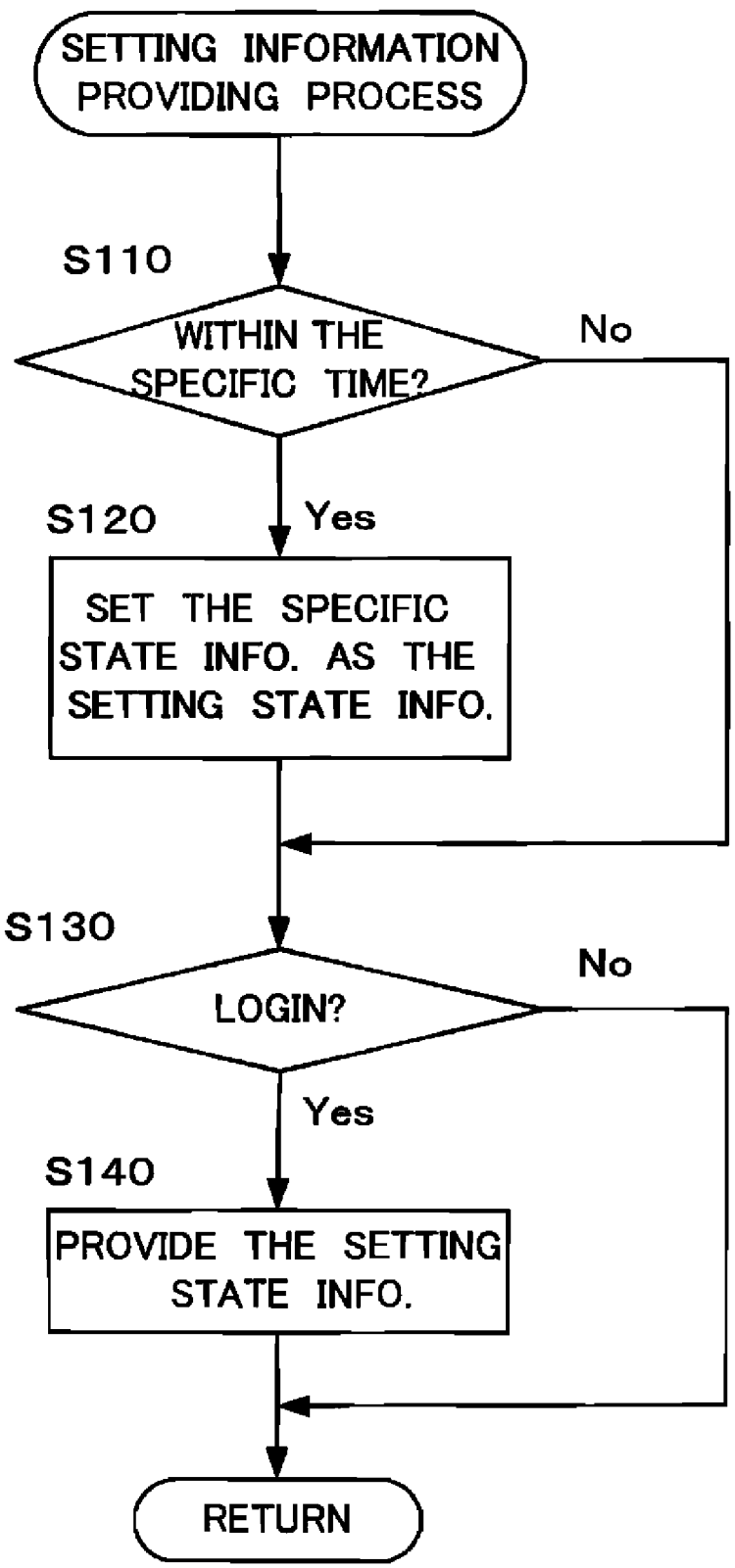
FIG. 8 is a flow chart showing process flow in a setting information providing process.

The setting information providing process will be explained according to a flowchart shown in FIG. 8. The setting information providing process will be repeatedly executed by the server control unit 12 as a setting information providing device. In the setting information providing process, firstly at step S110, it is judged whether the present time is within the specific time. In the present embodiment, the specific time is, for example, from noon up to 2 p.m. When it is judged that it is within the specific time, the process proceeds to step S120, at which the specific state information stored in the specific information storage device is set as the setting state information.

When it is judged that it is not within the specific time, the process proceeds to step S130 by skipping step S120. At step S130, it is judged whether the login operation from the portable terminal machine T is performed. When it is judged that there is the login operation from the portable terminal machine T, the setting state information is provided to the portable terminal machine T. After the setting state information is provided, or when there is no login operation, the process returns to step S110.

Figure 9:
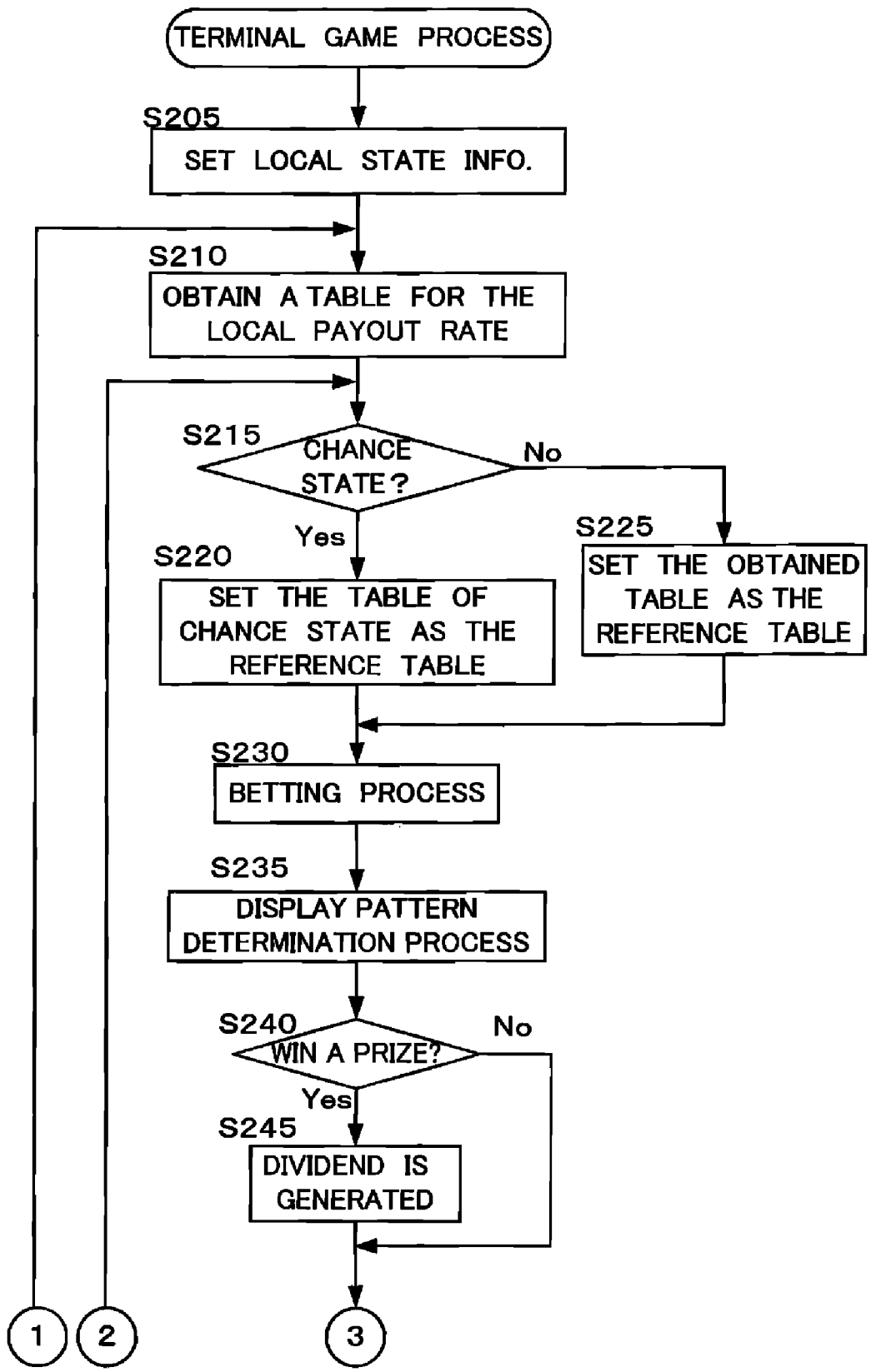
FIG. 9 is a flow chart showing process flow in terminal game process.
Figure 10:
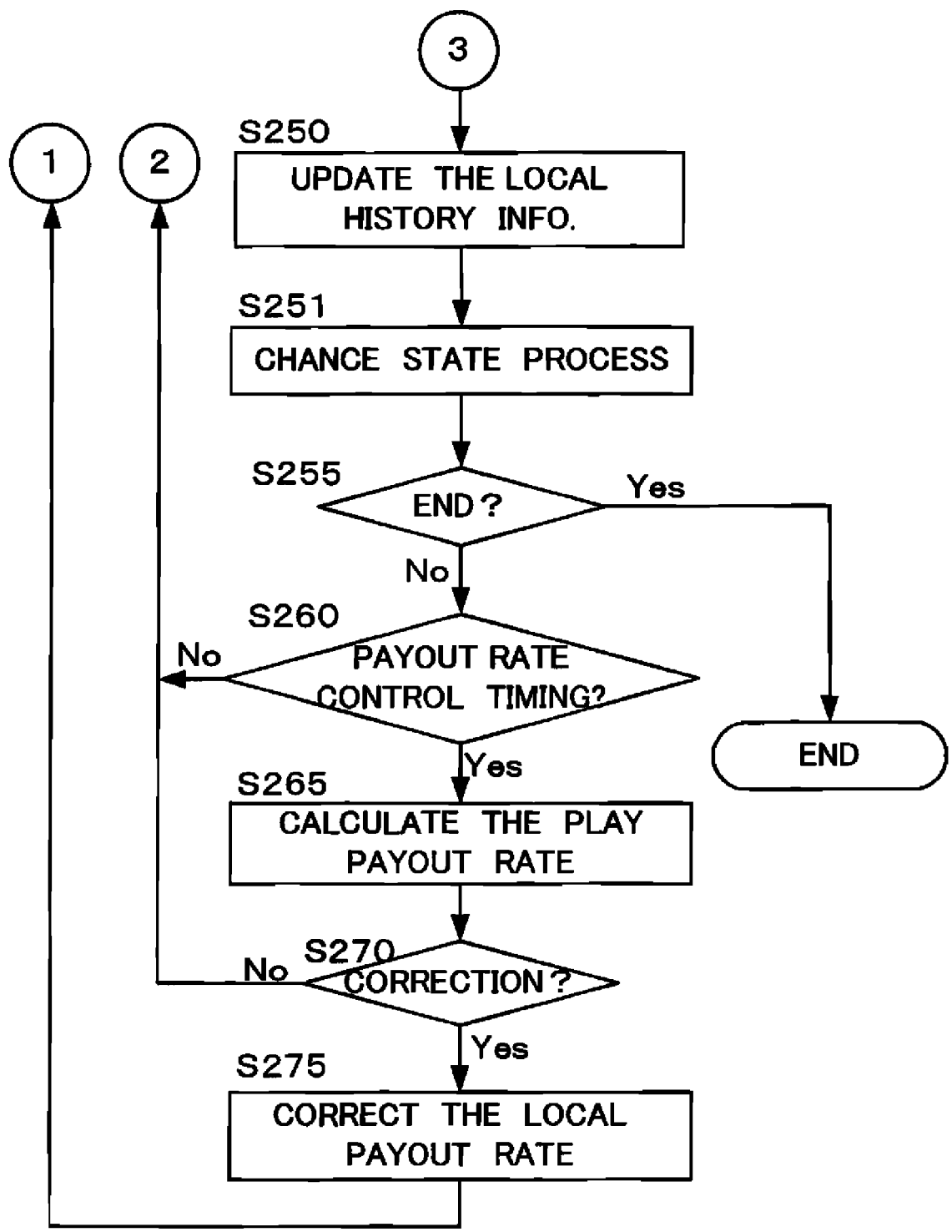
FIG. 10 is a flow chart showing process flow continued from the flow chart shown in FIG. 9.

Then, the processes executed in the terminal game process will be explained, according to a flow chart shown in FIG. 9 and FIG. 10. Each process in the terminal game process is controlled by the terminal control unit 25. Firstly, the obtained setting state information is set as the local state information at step S205. That is, the payout rate of the setting state information is set as the payout rate of a local state information (hereinafter, referred to as "the local payout rate"), and the chance state of the setting state information is set as the chance state of the local state information. Thereby, the terminal control unit 25 functions as the setting information obtaining device. As described above, the local state information at the beginning of the play is the same as the setting state information. Next, the table of winning prize probability corresponding to the local payout rate is obtained from the terminal storage device 24 at step S210.

Then, at step S215, it is judged whether it is a chance state or not. This judgment may be made, by referring to the chance state of the local state information. The chance state is a state in which the winning prize probability becomes higher than usual. Like an actual game machine, the chance state becomes the chance state when the predetermined conditions are satisfied during a play, and when the end conditions are satisfied, the chance state is terminated. When it is judged at step S215 that it is in the chance state, the process proceeds to step S220, and the table of chance states is obtained from the terminal storage device 24 to be set as the reference table. Then, when it is judged that it is not in the chance state, the process proceeds to step S225, and the table of winning prize probability table obtained at step S210 is set as the reference table.

Subsequently, the betting process is executed at step S230. The betting process is a processing for allowing the player to bet, and at least one bet line Y is determined. The player can bet one line Y for each one virtual medal, and the number of the virtual medals which the player can use is updated with the number of bets. In the reference table set at step S225, as mentioned above, an approval probability for each winning pattern according to the number of bets is set. In the betting process, the approval probability for each winning pattern is determined in accordance with the number of medals which the player bets.

Then, display pattern determination process is executed at step S235. At the display pattern determination process, an image looking like the reel portions 31 each of which is rotated is displayed on the game screen 30 as mentioned above, when a rotation starting operation is performed by the player. After that, a random number is sampled by an internal program, the table of winning prize probability is referred to, with the sampled random number as a key, and the kinds and the arrangements of patterns to be displayed as the game result are determined. When the predetermined time elapses after the rotation starting operation, the pattern determined by the program is displayed on the game screen 30.

Next, the process proceeds to step S240, and it is judged whether a bed line Y wins a prize. When a prize is won, the process proceeds to step S245, and a dividend corresponding to the prize is generated for proceeding to step S250. According to the present embodiment, a predetermined number of virtual medals are given to the player as the dividend. When it is judged at step S240 that a prize is not won, the process at step S245 is skipped, and the process proceeds to step S250.

At step S250, the local history information is updated. The local history information is information to recognize an actual state of given virtual medals, and, in the present embodiment, includes a play bet number for accumulating the number of bets from the moment of starting a play to the present time, and a play given number for accumulating the number of virtual medals given from the starting of the play to the present time. Accordingly, at step S250, the number of bets which are done in a game is added to the play bet number, and the number of virtual medals given by a dividend is added to the play given number. At step S250, the terminal control unit 25 functions as a result information obtaining device.

Furthermore, at step S251, chance state process is executed. In the chance state process, the chance state information is set to "1" if the condition for the chance state is satisfied when the present chance state information indicates "0". Moreover, when the present chance state information indicates "1", the chance state information is set to "0", if condition for ending the chance state is satisfied. At step S210 through step S251, the terminal control unit 25 functions as a game control device.

Next, the process proceeds to step S255, at which it is judged whether the play ends. When the operation for ending the program is performed by the player, it is judged that the play ends. When it is judged that the play ends at step S255, the terminal game process is ended. When it is not judged that the play ends, the process proceeds to step S260, and it is judged whether it is payout rate control timing. The payout rate control timing may be set as a predetermined elapsed time, or as a predetermined times of playing the game. When it is judged that it is not payout rate control timing, the process returns to step S215 in order to continuously play the next game.

At step S260, when it is judged that it is the payout rate control timing, the process proceeds to step S265, and the play payout rate as a result payout rate is calculated. The play payout rate may be obtained by the play bet number and the play giving number of the local history information. This play payout rate can be used as given state of virtual medals in the actual play. Next, the process proceeds to step S270, and it is judged whether correction of the local payout rate is required or not. For judging whether correction of the local payout rate is required or not, in the present embodiment, it is judged that the correction is required when a predetermined target value of the payout rate and the play payout rate are not within a predetermined range.

When it is judged at step S270 that the correction is not required, the process returns to step S215 in order subsequently to play the next game. When it is judged that the correction is required, the process proceeds to step S275, where the local payout rate is corrected so that the actual payout rate and the target value are within the predetermined range. Thereby, the local payout rate can be controlled so that the play payout rate, which is the actual payout rate, and the target value are in the predetermined range. A method to obtain a payout rate for this correction can be similar to the method in an actual slot machine.

After the correction of the local payout rate, the process returns to step S210 in order to obtain the table of winning prize probability for the local payout rate after the correction. In the step S260 through the step S275, the terminal control unit 25 functions as a local information control device. As the local payout rate and the chance state information are properly controlled as described above, the local state information at the moment of logout is different from the setting state information obtained from the server SS. Additionally, after the terminal game ends, the play result information is transmitted to the server SS as update information as described above. The play result information includes the play history information and the local state information at the moment of logout.

Figure 11:
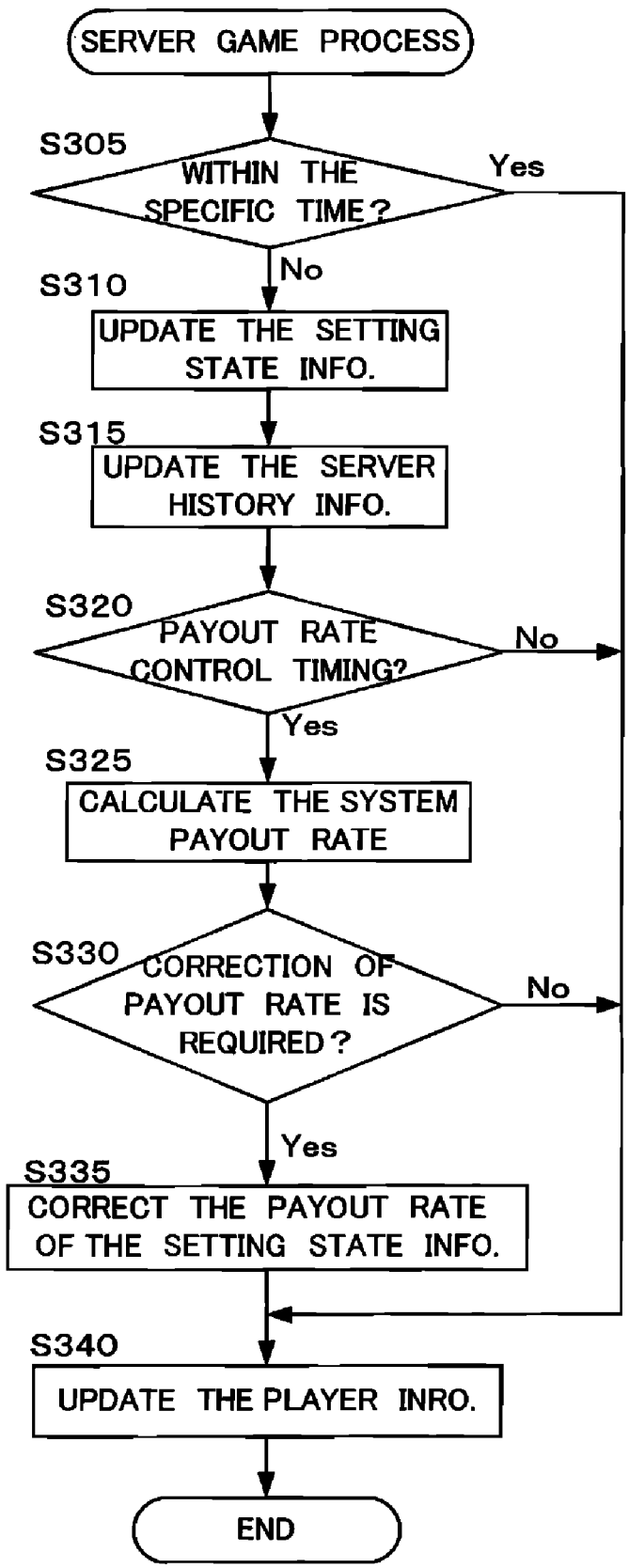
FIG. 11 is a flow chart showing process flow in a server game process.

Next, the process flow for server game process will be explained according to a flow chart in FIG. 11. Firstly, it is judged at step S305 whether the present time is within the specific time. When it is judged that it is within the specific time, the process proceeds to step S340. When it is judged that it is not within the specific time, the process proceeds to step S310, and the setting state information in the server storage device 11 is updated into the received local state information. Thereby, the server control unit 12 functions as a setting information update device. Next, the process proceeds to step S315, and the server history information is updated. The server history information includes an integrated bet number which is a total number of bets for all the portable terminal machines T in the game system GS, and an integrated given number which is the total of the given number of the virtual medals. The integrated number of bets is updated by adding the play bet number in the play result information, and the integrated given number is updated by adding the play given number of the play result information.

Next, it is judged whether it is the payout rate control timing. The payout rate control timing may be set, for example, as predetermined elapsed time, or reception times of the play result information. When it is judged that it is not the payout rate control timing at step S320, the process proceeds to step S324. When it is judged that it is the payout rate control timing, the process proceeds to step S325, and the system payout rate is calculated. The system payout rate is obtained by the integrated bet number and the integrated given number of the server history information. Thereby, the actual payout rate for the whole game system GS can be obtained. At step S315 and step S325, the server control unit 12 functions as a system payout rate obtaining device.

Then, it is judged at step S330 whether correction of the payout rate of the setting state information is required. Similar to the case of local payout rate, when the target value and the history payout rate are in a predetermined range, it is judged that the correction of the payout rate of the setting state information is not required, and the process proceeds to step S340. When it is judged that correction is required, the process proceeds to step S335, at which the payout rate of the setting state information is corrected so that the target value and the history payout rate are within the predetermined range. The above correction method may be the same as the method for correcting the local payout rate.

Then, the process proceeds to step S340. At step S340, the player information which is personal information of the player is updated. For example, when there are virtual medals pooled in the player information, the number of the pooled virtual medals is updated from the play given number and the play bet number of the play result information. Moreover, a player payout rate which is a payout rate of the individual player is updated from the play times and the play given number.

The present invention is not limited to the above described embodiments, and various kinds of embodiments may be executed. For example, a plurality of lamps each of which lights every winning a prize are provided, when all the lamps are turned on, a predetermined privilege may be given to a player. The number of lighted lamps may be included in the setting state information. The portable terminal machine T may be just a portable type device in which a game of the present invention can be played. The order of plural processes in the flow charts can be changed if the present invention can be executed.

The game in the game system of the present invention may be a game which is configured such that a so-called pusher game provided by an arcade game machine can be virtually played at the portable terminal machine T. In this case, stay information indicating a state that plural virtual medals are put in a stay field is included in the setting state information provided to the portable terminal machine T by the setting information providing device of the server SS. The portable terminal machine T obtains the stay information from the server SS by the setting information obtaining device, and sets the stay information as local stay information to be the local state information.

By the game control device, a game screen, where a stay field having virtual medals, a pusher device performing reciprocating movement on the stay field, a plurality of virtual medals staying on the stay field, and a falling field which the virtual medals pushed out from the stay field by the pusher device fall to are provided in a virtual space, is displayed by the display device 21. The state of staying of virtual medals in the stay field is set based on the local stay information.

Then, when a predetermined operation is performed by a player, the virtual medals are put into the stay field replying to the operation of the player, and position information of the put virtual medals is added to the local stay information. The operation content of a player includes an operation speed, an operation strength, operation times and the like. By the local information control device, the state of stay of each virtual medal is changed by the movement of the pusher device to determine a medal to fall into the falling field. The control of the local stay information may be performed, for example, by a calculation formula for simulating the state of stay of the virtual medals changing by the pusher device.

The reciprocal movement by the pusher device is repeated, and the local stay information which is the stay information on the virtual medals is changed every time the pusher device pushes the virtual medals in the direction of pushing out. The portable terminal machine T includes in the play result information and sends to the server SS, the local stay information at the moment of game end of its own machine. When the server SS receives the play result information, the held stay information is updated into the stay information included in the received play result information by the setting information update device.

Moreover, the game system of the present invention may be configured such that plural kinds of setting state information are identified by identification information peculiar to each setting state information. In this case, each setting state information is associated with the identification information and held in the server storage device 11. The portable terminal machine T requires the setting state information by specifying the identification information at the moment of login, and the server SS provides the setting state information corresponding to the specified identification information to the portable terminal machine T. Moreover, the portable terminal machine T transmits at the moment of logout to the server SS, the play result information with the identification information specified at the login. The server SS updates the setting state information corresponding to the specified identification information to the local state information included in the play result information.

Figure 12:
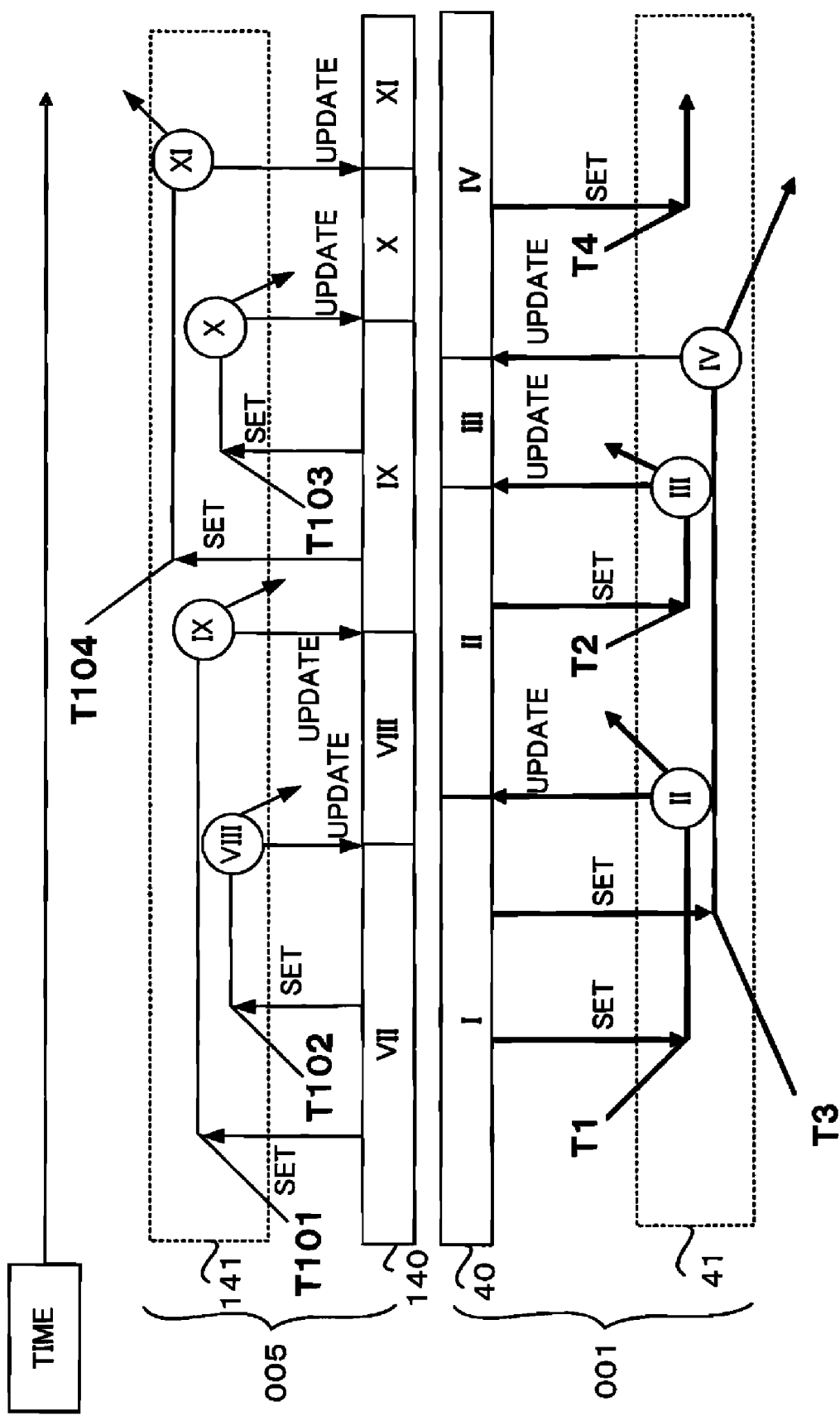
FIG. 12 is a diagram showing a relation between the setting state information and the state of each portable terminal machine in a case where plural kinds of setting state information are prepared.

When the plural kinds of setting state information exists, a relation between each of setting state information and each of portable terminal machines T will be described, using FIG. 12. In the present embodiment, the portable terminal machines T . . . T4 can use the setting state information 40 of the identification number 001 by specifying the identification number 001, and, by specifying the identification number 005, the portable terminal machines T101 . . . T104 can use the setting state information 140. A relation between the portable terminal machines T1 . . . T4 and the setting state information 40 is similar to that in FIG. 5. A relation between the setting state information 140 and the portable terminal machines T101 . . . 104 will be explained. Additionally, the rectangle 141 shows the portable terminal machine T in the login state using the setting state information 140.

Firstly, the portable terminal machine T101 and the portable terminal machine T102, which have logged in at the state in which the setting state information 140 indicates the state of VII are set to the state of "VII", respectively. Subsequently, the setting state information 140 is updated from the state of "VII" into the state of "VIII" by logout of the portable terminal machine 102, and the setting state information is updated from the state of "VIII" into the state of "IX" by logout of the portable terminal machine 101. Subsequently, each the portable terminal machines T104 and R103, which has logged in at the moment when the setting state information 140 indicates the state of "IX", is set to the state of "IX". The setting state information 140 is updated from the state of "IX" into the state of "X" by logout of the portable terminal machine T103, and moreover updated from the state of "X" into the state of "XI" by logout of the portable terminal machine T104. As mentioned above, the setting state information 140 and the setting state information 40 are independently updated, and the setting state information corresponding to the identification number specified by the portable terminal machine T is provided to the portable terminal machine T.

As mentioned above, when plural kinds of setting state information are stored in the server storage device 11, the server history information is also managed for each identification number. Accordingly, in the server game process, for the identification information included in the play result information from the portable terminal machine T, the processes about the server history information and the setting state information corresponding to the identification information are executed. Namely, at step S315, the server history information corresponding to the identification information included in the play result information (hereinafter, referred to as "play identification information") is updated. In the case of the payout rate control timing, at step S325, the ID payout rate which is the payout rate with respect to the play identification information is calculated. Thereby, the server control unit 12 functions as a ID payout rate obtaining device.

Then, when it is judged that the correction of the payout rate is required, at step S335, the payout rate of the setting state information of the play identification number is corrected. Thereby, the server control unit 12 functions as an ID setting information correction device. Additionally, even when plural kinds of setting state information are managed with the identification number, the payout rate may not be managed for each identification information, but as mentioned above, may be managed and controlled as a whole system. Moreover, during the specific time, only the setting state information corresponding to a specific identification number may be treated as the specific state information, or all the setting state information may be treated as the specific state information.

The invention claimed is:

1. A game system including a server and a plurality of terminal machines capable of communicating with the server, a game being executed based on operations of a player by consuming predetermined virtual game value in each of the plurality of terminal machines, wherein the server comprises:
a setting information storage device for storing setting state information indicating a state relating to the game to be set in the terminal machine as local state information of the terminal machine, the setting state information being stored as information to be shared among the plurality of terminal machines;
a setting information update device for updating, when the update information is obtained from any one of the terminal machines, the update information indicating a state relating to the game at an end of the game in the terminal machine, the setting state information of the setting information storage device so as to indicate the state relating to the game indicated by the update information; and
a setting information providing device for providing the setting state information of the setting information storage device to another one of the terminal machines regardless of a player when the setting state information is required by the terminal machine; and each of the plurality of terminal machines comprises:
a setting information obtaining device for requiring the setting state information from the server when a starting operation of the game is performed to obtain the setting state information from the server, and setting the obtained setting state information as local state information indicating a state relating to the game of its own;
a game control device executing the game based on the local state information;
a local information control device for varying the local state information with situations of the game; and
an update information transmission device for transmitting the local state information as the update information to the server when an ending operation of the game is performed.

2. A game system including a server and a plurality of terminal machines capable of communicating with the server, a game being executed based on operations of a player by consuming predetermined virtual game value in each of the plurality of terminal machines, wherein the server comprises:
a setting information storage device for storing setting state information indicating a state relating to the game to be set in the terminal machine as local state information of the terminal machine, the setting state information being stored as information to be shared among the plurality of terminal machines;
a setting information update device for updating, when the update information is obtained from any one of the terminal machines, the update information indicating a state relating to the game at an end of the game in the terminal machine, the setting state information of the setting information storage device so as to indicate the state relating to the game indicated by the update information; and
a setting information providing device for providing the setting state information of the setting information storage device to another one of the terminal machines regardless of a player when the setting state information is required by the terminal machine; and each of the plurality of terminal machines comprises:
a setting information obtaining device for requiring the setting state information from the server when a starting operation of the game is performed to obtain the setting state information from the server, and setting the obtained setting state information as local state information indicating a state relating to the game of its own;
a game control device executing the game based on the local state information:
a local information control device for varying the local state information with situations of the game; and
an update information transmission device for transmitting the local state information as the update information to the server when an ending operation of the game is performed, wherein
the game is a game in which the virtual game value is given to a player depending on a game result obtained by a probability which is changed by the state of the terminal machine,
the setting state information includes information relating to a payout rate of the game value,
the game control device executes the game by setting the probability according to a local payout rate obtained from the local state information,
the terminal machine further has a result information obtaining device for obtaining properly from giving situations of the game value in the game executed in its own, a result payout rate which is a payout rate depending on play process in the game, and
the local information control device corrects the information relating to the payout rate of the local state information so that the result payout rate approaches a target value which has been set beforehand.

3. The game system according to claim 2, wherein
the server further comprises:
a system payout rate obtaining device for obtaining properly a system payout rate which is a payout rate depending on a play process in the game in the plurality of terminal machines, by collecting from each of the terminal machines, information relating to the result payout rate at the moment of ending operation; and
a setting information correction device for correcting the setting state information in the server storage device so that the system payout rate approaches the target value.

4. The game system according to claim 1, wherein
the server further comprises a specific information storage device storing specific state information by which the terminal machine is set to a specific state, and the setting information providing device provides the specific state information as the setting state information to the terminal machine while predetermined specific conditions are satisfied.

5. A game system including a server and a plurality of terminal machines capable of communicating with the server, a game being executed based on operations of a player by consuming predetermined virtual game value in each of the plurality of terminal machines, wherein the server comprises:
  a setting information storage device for storing setting state information indicating a state relating to the game to be set in the terminal machine as local state information of the terminal machine, the setting state information being stored as information to be shared among the plurality of terminal machines;
  a setting information update device for updating, when the update information is obtained from any one of the terminal machines, the update information indicating a state relating to the game at an end of the game in the terminal machine, the setting state information of the setting information storage device so as to indicate the state relating to the game indicated by the update information; and
  a setting information providing device for providing the setting state information of the setting information storage device to another one of the terminal machines regardless of a player when the setting state information is required by the terminal machine; and each of the plurality of terminal machines comprises:
  a setting information obtaining device for requiring the setting state information from the server when a starting operation of the game is performed to obtain the setting state information from the server, and setting the obtained setting state information as local state information indicating a state relating to the game of its own;
  a game control device executing the game based on the local state information;
  a local information control device for varying the local state information with situations of the game; and
  an update information transmission device for transmitting the local state information as the update information to the server when an ending operation of the game is performed, wherein
  each of plural kinds of the setting state information is stored in the setting information storage device in such a way that the each of setting state information is associated with an identification number unique to the setting state information,
  the setting information obtaining device obtains the setting state information corresponding to the identification number by specifying the identification number, and sets the setting state information as the local state information,
  the update information transmission device transmits to the server, the update information including the identification number of the obtained setting state information,
  the setting information providing device provides to the terminal machine, the setting state information corresponding to the identification number specified by the terminal machine, and the setting information update device updates with the update information, the setting state information corresponding to the identification number included in the update information.

6. The game system according to claim 5, wherein the setting information storage device stores the setting state information corresponding to the specified identification number as information to be shared among the plurality of terminal machines specifying the identification number.

7. The game system according to claim 5, wherein
  the setting information storage device stores the setting state information corresponding to the specified identification number as information to be shared among the plurality of terminal machines specifying the identification number,
  the game is a game in which the virtual game value is given to a player depending on a game result obtained by a probability which is changed by the state of the terminal machine,
  the each setting state information includes information relating to a payout rate of the game value,
  the game control device executes the game by setting the probability according to a local payout rate obtained from the local state information,
  the terminal machine further has a result information obtaining device obtaining properly a result payout rate which is a payout rate depending on play process in the game from giving situations of the game value in the game executed in its own, and
  the local information control device corrects the information relating to the payout rate of the local state information so that the result payout rate approaches a target value which has been set beforehand.

8. The game system according to claim 5, wherein
  the game is a game in which the virtual game value is given to a player depending on a game result obtained by a probability which is changed by the state of the terminal machine,
  the each setting state information includes information relating to a payout rate of the game value,
  the game control device executes the game by setting the probability according to a local payout rate obtained from the local state information,
  the terminal machine further has a result information obtaining device obtaining properly a result payout rate which is a payout rate depending on play process in the game from giving situations of the game value in the game executed in its own, and
  the local information control device corrects the information relating to the payout rate of the local state information so that the result payout rate approaches a target value which has been set beforehand,
  wherein the server further comprises:
    an ID payout rate obtaining device for obtaining properly an ID payout rate which is a payout rate depending on the play process in the game in each of the terminal machines using the setting state information corresponding to the identification information for each identification information, by collecting together with the identification information, information relating to the result payout rate at the ending operation from each of the terminal machines; and
    an ID setting information correction device correcting the setting state information of the identification information corresponding to the ID payout rate so that the ID payout rate approaches the target value.

9. The game system according to claim 5, wherein
the setting information storage device stores the setting state information corresponding to the specified identification number as information to be shared among the plurality of terminal machines specifying the identification number,
the server further has a specific information storage device for storing specific state information by which the terminal machine is set to a specific state, and
the setting information providing device provides the specific state information as the setting state information to the terminal machine while predetermined specific conditions are satisfied, with respect to the setting state information corresponding to at least one of the identification numbers.

10. The game system according to claim 1, wherein the game is a virtual slot game, and the game value is virtual medals.

11. A server included in a game system including the server and a plurality of terminal machines capable of communicating with the server, a game being executed based on operations of a player by consuming a predetermined virtual game value in each of the plurality of terminal machines, wherein the server comprises:
a setting information storage device storing setting state information indicating a state relating to the game to be set in the terminal machine as local state information of the terminal machine, the setting state information being stored as information to be shared among the plurality of terminal machines;
a setting information update device updating, when the update information is obtained from any one of the terminal machines, the update information indicating a state relating to the game at an end of the game in the terminal machine, the setting state information of the setting information storage device so as to indicate the state relating to the game indicated by the update information; and
a setting information providing device for providing the setting state information of the setting information storage device to another one of the terminal machines regardless of a player when the setting state information is required by the terminal machine.

12. A terminal machine of a plurality of terminal machines in a game system including a server holding setting state information indicating a state to be set in each of the plurality of terminal machines, and the plurality of terminal machines capable of communicating with the server, a game being executed based on operations of a player by consuming a predetermined virtual game value in each of the plurality of terminal machines, the terminal machine comprising:
a setting information obtaining device for requesting the setting state information from the server when a starting operation of the game is performed, obtaining the setting state information from the server, and setting the obtained setting state information as local state information indicating a state relating to the game of its own machine, wherein the obtained setting state information was previously obtained by the server from another one of the terminal machines;
a game control device for executing the game based on the local state information;
a local information control device for varying the local state information with situations of the game; and
an update information transmission device for transmitting the local state information as the update information to the server when an ending operation of the game is performed.

13. The game system according to claim 5, wherein
the game is a game in which the virtual game value is given to a player depending on a game result obtained by a probability which is changed by the state of the terminal machine, the each setting state information includes information relating to a payout rate of the game value,
the game control device executes the game by setting the probability according to a local payout rate obtained from the local state information,
the terminal machine further has a result information obtaining device obtaining properly a result payout rate which is a payout rate depending on play process in the game from giving situations of the game value in the game executed in its own, and
the local information control device corrects the information relating to the payout rate of the local state information so that the result payout rate approaches a target value which has been set beforehand,
wherein
the server further has a specific information storage device for storing specific state information by which the terminal machine is set to a specific state, and
the setting information providing device provides the specific state information as the setting state information to the terminal machine while predetermined specific conditions are satisfied, with respect to the setting state information corresponding to at least one of the identification numbers.

14. The game system according to claim 5, wherein
the game is a game in which the virtual game value is given to a player depending on a game result obtained by a probability which is changed by the state of the terminal machine, the each setting state information includes information relating to a payout rate of the game value,
the game control device executes the game by setting the probability according to a local payout rate obtained from the local state information,
the terminal machine further has a result information obtaining device obtaining properly a result payout rate which is a payout rate depending on play process in the game from giving situations of the game value in the game executed in its own, and
the local information control device corrects the information relating to the payout rate of the local state information so that the result payout rate approaches a target value which has been set beforehand,
wherein the server further comprises:
an ID payout rate obtaining device for obtaining properly an ID payout rate which is a payout rate depending on the play process in the game in each of the terminal machines using the setting state information corresponding to the identification information for each identification information, by collecting together with the identification information, information relating to the result payout rate at the ending operation from each of the terminal machines; and
an ID setting information correction device correcting the setting state information of the identification information corresponding to the ID payout rate so that the ID payout rate approaches the target value, wherein the server further has a specific information storage device for storing specific state information by which the terminal machine is set to a specific state, and the setting information providing device provides the specific state information as the setting state information to the terminal machine while predetermined specific conditions are satisfied, with respect to the setting state information corresponding to at least one of the identification numbers.

15. The game system according to claim 1, wherein the setting information storage device stores the setting state information as information to be shared among the plurality of terminal machines, the game is a game in which the virtual game value is given to a player depending on a game result obtained by a probability which is changed by the state of the terminal machine, the setting state information includes information relating to a payout rate of the game value, the game control device executes the game by setting the probability according to a local payout rate obtained from the local state information, the terminal machine further has a result information obtaining device for obtaining properly from giving situations of the game value in the game executed in its own, a result payout rate which is a payout rate depending on play process in the game, and the local information control device corrects the information relating to the payout rate of the local state information so that the result payout rate approaches a target value which has been set beforehand.

16. The game system according to claim 1, wherein the setting information storage device stores the setting state information as information to be shared among the plurality of terminal machines, the game is a game in which the virtual game value is given to a player depending on a game result obtained by a probability which is changed by the state of the terminal machine, the setting state information includes information relating to a payout rate of the game value, the game control device executes the game by setting the probability according to a local payout rate obtained from the local state information, the terminal machine further has a result information obtaining device for obtaining properly from giving situations of the game value in the game executed in its own, a result payout rate which is a payout rate depending on play process in the game, and the local information control device corrects the information relating to the payout rate of the local state information so that the result payout rate approaches a target value which has been set beforehand, wherein the server further comprises:

a system payout rate obtaining device for obtaining properly a system payout rate which is a payout rate depending on a play process in the game in the plurality of terminal machines, by collecting from each of the terminal machines, information relating to the result payout rate at the moment of ending operation; and a setting information correction device for correcting the setting state information in the server storage device so that the system payout rate approaches the target value.

17. The game system according to claim 1, wherein the setting information storage device stores the setting state information as information to be shared among the plurality of terminal machines, the game is a game in which the virtual game value is given to a player depending on a game result obtained by a probability which is changed by the state of the terminal machine, the setting state information includes information relating to a payout rate of the game value, the game control device executes the game by setting the probability according to a local payout rate obtained from the local state information, the terminal machine further has a result information obtaining device for obtaining properly from giving situations of the game value in the game executed in its own, a result payout rate which is a payout rate depending on play process in the game, and the local information control device corrects the information relating to the payout rate of the local state information so that the result payout rate approaches a target value which has been set beforehand, wherein the server further comprises:

a system payout rate obtaining device for obtaining properly a system payout rate which is a payout rate depending on a play process in the game in the plurality of terminal machines, by collecting from each of the terminal machines, information relating to the result payout rate at the moment of ending operation; and a setting information correction device for correcting the setting state information in the server storage device so that the system payout rate approaches the target value, wherein the server further has a specific information storage device storing specific state information by which the terminal machine is set to a specific state, and the setting information providing device provides the specific state information as the setting state information to the terminal machine while predetermined specific conditions are satisfied.

* * * * *